United States Patent [19]
Suzuki et al.

[11] Patent Number: 4,800,254
[45] Date of Patent: Jan. 24, 1989

[54] COMMODITY INFORMATION TRANSMISSION SYSTEM FOR ON-LINE TRANSACTION NETWORK

[75] Inventors: Shigeaki Suzuki, Komaki; Tatsuya Nozaki, Tokyo, both of Japan

[73] Assignees: CDK Corporation; Credix Corporation, both of Japan

[21] Appl. No.: 912,428

[22] Filed: Sep. 26, 1986

[30] Foreign Application Priority Data

Oct. 8, 1985 [JP] Japan ................................ 60-222680

[51] Int. Cl.[4] .......................... G06K 5/00; G06F 15/24
[52] U.S. Cl. ...................................... 235/380; 235/385
[58] Field of Search ................. 235/381, 380, 383, 385

[56] References Cited

U.S. PATENT DOCUMENTS 4,345,146 8/1982 Story et al. .......................... 235/381
4,414,467 11/1983 Gould ................................. 235/381
4,639,875 1/1987 Abraham et al. ............... 235/381 X

FOREIGN PATENT DOCUMENTS 2143662 2/1985 United Kingdom ................ 235/381

*Primary Examiner*—Roy N. Envall, Jr.
*Attorney, Agent, or Firm*—Lowe, Price, LeBlanc, Becker & Shur

[57] ABSTRACT

In an on-line transaction network, in order to transmit to an administration center the custodial positions of commodities in each terminal transaction device and the contents of the commodities kept in custody thereat, the center is provided with a memory device in which a plurality of commodity patterns specifying the corresponding relations between the custodial positions of the commodities and the contents thereof are stored beforehand along with pattern codes affixed to the commodity patterns, and after the commodity has been put in the terminal transaction device in accordance with any of the commodity patterns, the pattern code indicative of the commodity pattern is sent to the center, whereby information for transaction administration is obtained.

12 Claims, 4 Drawing Sheets

COMMODITY INFORMATION TRANSMISSION SYSTEM FOR ON-LINE TRANSACTION NETWORK

BACKGROUND OF THE INVENTION

The present invention relates to an on-line automatic transaction network, and more particularly to a commodity information transmission system therefor.

An on-line automatic transaction network with which goods such as recorded video tapes (hereinbelow, simply termed "video tapes") can be rented, sold and returned by the use of credit cards, has been known from, for example, the official gazette of Japanese Patent Application Laid-open No. 6549/1983. In each of the terminal transaction devices of such an on-line automatic transaction network for video tapes, about 200 video tapes are usually kept in custody. Moreover, the recorded video tapes include many titles, and there are two types of standards for the video tapes. Accordingly, the sorts of video tapes to be handled are as large in number as several tens.

Meanwhile, contents recorded on the video tapes are classified into several fields such as amusement, culture and famous movies. Assuming by way of example that the volume of dealings in business quarters be at proportions of 5, 3 and 2 in the order of the aforementioned fields, it is conjectured to become proportions of 2, 3 and 5 in a residential district. Also, the ratio between rent and sale is conjectured to differ. Since, in this manner, the situations of transactions differ depending upon the installed places of the terminal transaction devices, each terminal should preferably keep commodities in conformity with the possibility of transactions in the installed place thereof.

Moreover, in the on-line automatic transaction network, an administration center controls commodities and disposes of transactions. Therefore, the stocked states of commodities in the individual automatic transaction devices need to be stored in the administration center or the automatic transaction devices at all times. To this end, each time a service man has placed video tapes into the terminal transaction device, he must input data as to which video tapes have been placed on respective custodial shelves.

However, it is a laborious job for the service man of the terminal transaction device that the data items on as many shelves of the device as 200 are input on each occasion. Besides, it is inevitable to err.

Incidentally, conventional vending machines are chiefly directed to scant kind and mass sales, so that the kinds of commodities are of only, at most, ten odd. Moreover, it suffices to grasp the total stocks of the respective kinds of commodities in an administration center, and it is unnecessary to grasp the commodities in custody in association with corresponding shelves, in the center.

In order to realize on-line transactions in such a way that a large number of commodities of many sorts, e.g., video tapes, are stored in terms of commodity patterns corresponding to the installed places of terminal transaction devices and that the commodity patterns are concentratively controlled in an administration center, it is required that, as to the respective shelves of the individual terminal transaction devices, the titles, standards etc. of the video tapes kept thereon be stored as transaction administering information in the center.

It is sometimes required that, also in the terminal transaction device, the contents of the commodities kept on the respective shelves be stored for the purpose of administering the transactions of the device itself.

SUMMARY OF THE INVENTION

It is accordingly an object of the present invention to provide a commodity information transmission system for an on-line transaction network which is free from the disadvantages of the prior art and which satisfies the requirements mentioned above.

According to the present invention, a plurality of commodity patterns indicative of the corresponding relations between the custodial positions of commodities such as video tapes and the contents of the commodities, for example, video titles, tape standards, and classification for rent and for sale are determined beforehand, while pattern codes are determined for the respective commodity patterns, and the commodity patterns are stored in correspondence with the pattern codes in the memory device of an administration center.

A service man for a terminal transaction device places a video tape on the shelf of the terminal transaction device in accordance with any of the commodity patterns, and thereafter sends the administration center the pattern code expressive of the commodity pattern. On the side of the administration center, the commodity patterns indicative of the contents of the video tapes kept on the respective shelves of the individual terminal transaction devices are stored in a transaction administering memory device in response to such pattern codes sent.

In a case where the terminal transaction device requires the commodity patterns to the end of administering transactions, the administration center reads out the commodity patterns from the memory device thereof and transfers them to the terminal transaction device so as to store them in the transaction administering memory device of this terminal device.

It is a matter of course that, when both the administration center and the terminal transaction device require the commodity patterns, these patterns can be stored in their memory devices for administering transactions.

To sum up, in an administration center, regarding a plurality of predetermined commodity patterns for commodities such as video tapes, data items necessary for transactions such as the titles and standards of the video tapes to be kept on respective shelves are previously stored along with pattern codes indicative of the commodity patterns. In response to the pattern code sent from a service man who has put the commodity into a terminal transaction device, the administration center reads out the commodity pattern of the terminal transaction device and stores it in the transaction administering memory device thereof or transfers it to the same terminal transaction device so as to store it in the transaction administering memory device thereof.

PREFERRED EMBODIMENTS OF THE INVENTION

Figure 1:
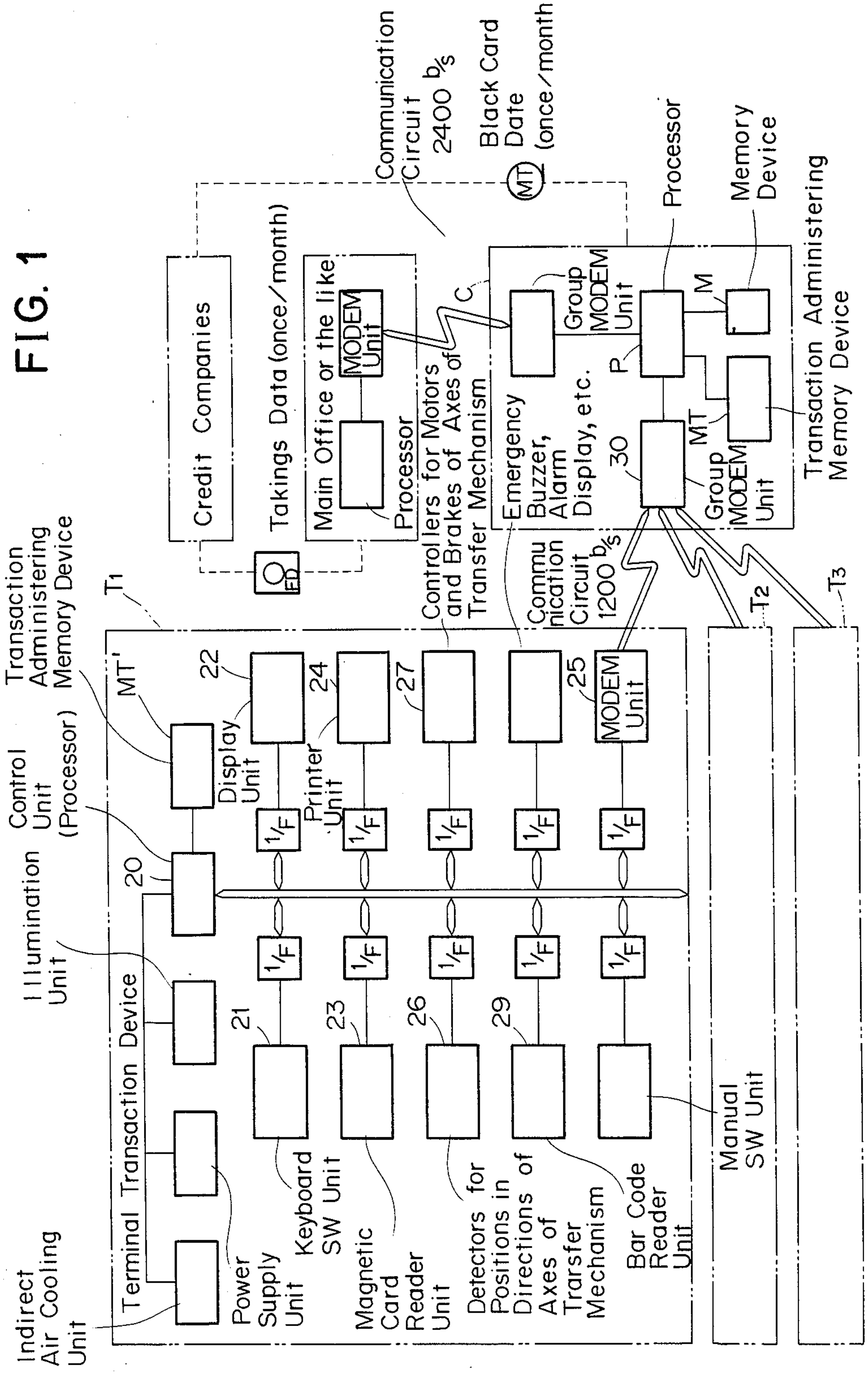
FIG. 1 is a block diagram of an embodiment of the present invention;.

As shown in FIG. 1, an on-line transaction network to which the present invention is applied is so constructed that a plurality of terminal transaction devices are connected to an administration center through communication circuits, whereby transaction information items at the respective terminals are collected to the center. The administration center classifies and totalizes the charges of transactions, and thereafter reports the totals to credit companies etc. in on-line or off-line fashion. Alternatively, the center can directly conduct the operations of clearing the charges.

Figure 2:
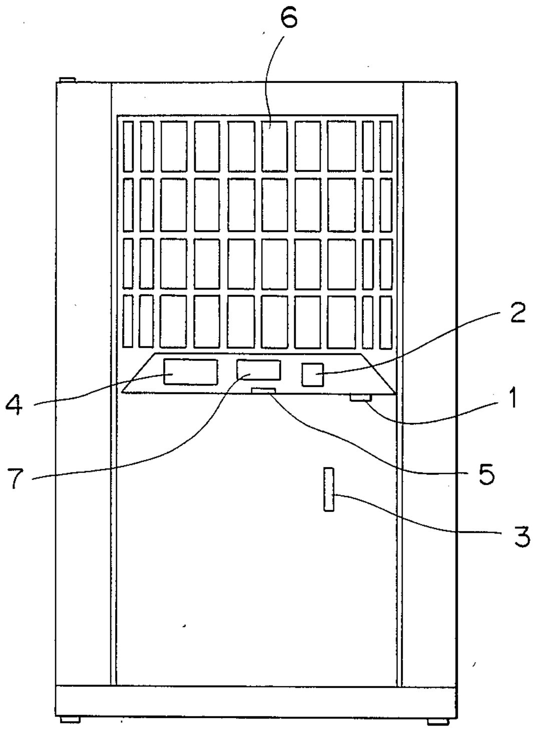
FIGS. 2 and 3 are a front view and a sectional view of a terminal transaction device, respectively.

FIG. 2 shows the external appearance of the terminal transaction device of the on-line transaction network to which the present invention is applied. The terminal transaction device with which commodities are dealt in through credit cards is provided on its outer side with a port 1 for inserting the credit card; a keyboard 2 which includes ten-keys, four operation mode selection keys for rent, sale, return and cancel, and standard keys indicative of the standards of tapes; a release port 3 which serves also as a port for receiving the commodity into the terminal transaction device; a display 4 which instructs a customer an operation; and a receipt delivery port 5. Numeral 6 designates an area in which a poster, a jacket or the like indicating the content of the title of the video tape to be dealt in is demonstrated, and numeral 7 an indication panel which informs the customer of the contract of a transaction.

Figure 3:
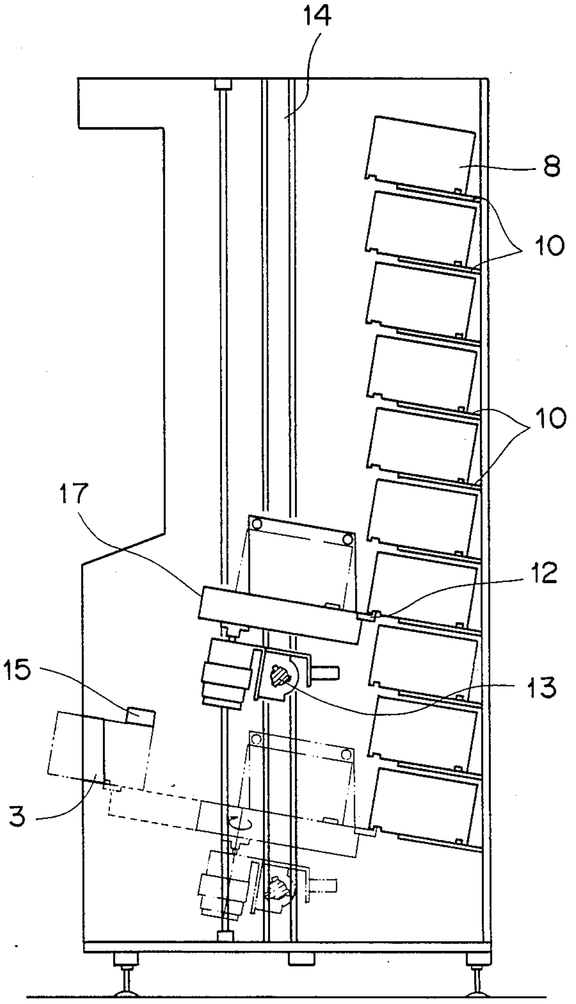

As shown by a sectional view in FIG. 3, the terminal transaction device is furnished in the interior thereof with shelves 10 which keep commodities such as video tapes 8 in custody and which are arranged in, for example, twenty columns and ten stages, an automatic transfer mechanism, a credit card checking and reading unit, a receipt printer, and processor which controls the components mentioned above and which exchanges various information items with the administration center, and so forth. The aforementioned automatic transfer mechanism may be an automatic transfer means in a known automated wherehouse, comprising a transport head 17 which draws out the commodity 8 from the selected shelf 10 by means of a pawl 12 and places it thereon and then turns by 180° so as to release the commodity from the release port 3 and which withdraws the commodity inserted into the release port 3, so as to put it on the custodial shelf 10 or in a reject box, and a head moving mechanism which moves the transport head 17 along gude rails 13 and 14 in lateral and vertical directions for the purpose of opposing this head to the selected shelf and the release port.

Provided inside the release port 3 of the terminal transaction device is a bar code reader 15 by which commodity identifying information such as a bar code affixed to the commodity is read in case of the release or reception of the commodity. This bar code reader can be used for acknowledging that the commodity to be released in one requested by the customer and for acknowledging that the received commodity has been properly returned.

FIG. 1 shows the electrical arrangement of the on-line transaction network to which the present invention is applied. A terminal transaction device T comprises a keyboard switch unit 21, a display unit 22, a magnetic card reader unit 23 for reading a credit card, a printer unit 24, a modem unit 25 for communications with an administration center, detectors 26 for detecting positions in the directions of the respective axes of the transfer mechanism, and controllers 27 for controlling the motors, brakes etc. of the transfer mechanism, all these constituents being connected to a control unit (processor) 20 through interfaces. According to the present invention, the terminal is provided with a transaction administering memory device MT'. Besides, if desired, a bar code unit 29 is provided inside the release port as stated before.

The administration center C has a processor P which is associated with a memory device M as well as a transaction administering memory device MT and which is connected through a group modem unit 30 for communicating with a plurality of terminal transaction devices $T_1$, $T_2$ ..... via communication circuits.

Further, if necessary, the administration center C may well be connected to a management organ such as main office, banking organs, credit companies, etc. in on-line fashion.

It is a matter of course that a dedicated memory device need not be disposed as the transaction administering memory device of the terminal or the center, but that a partial area of the memory device for storing a control program etc. can be used as such.

In the above, the practicable arrangement of the terminal transaction device has been described within a scope required for understanding the subject matter of the present invention. It is believed that further detailed description will be unnecessary.

Figure 4:
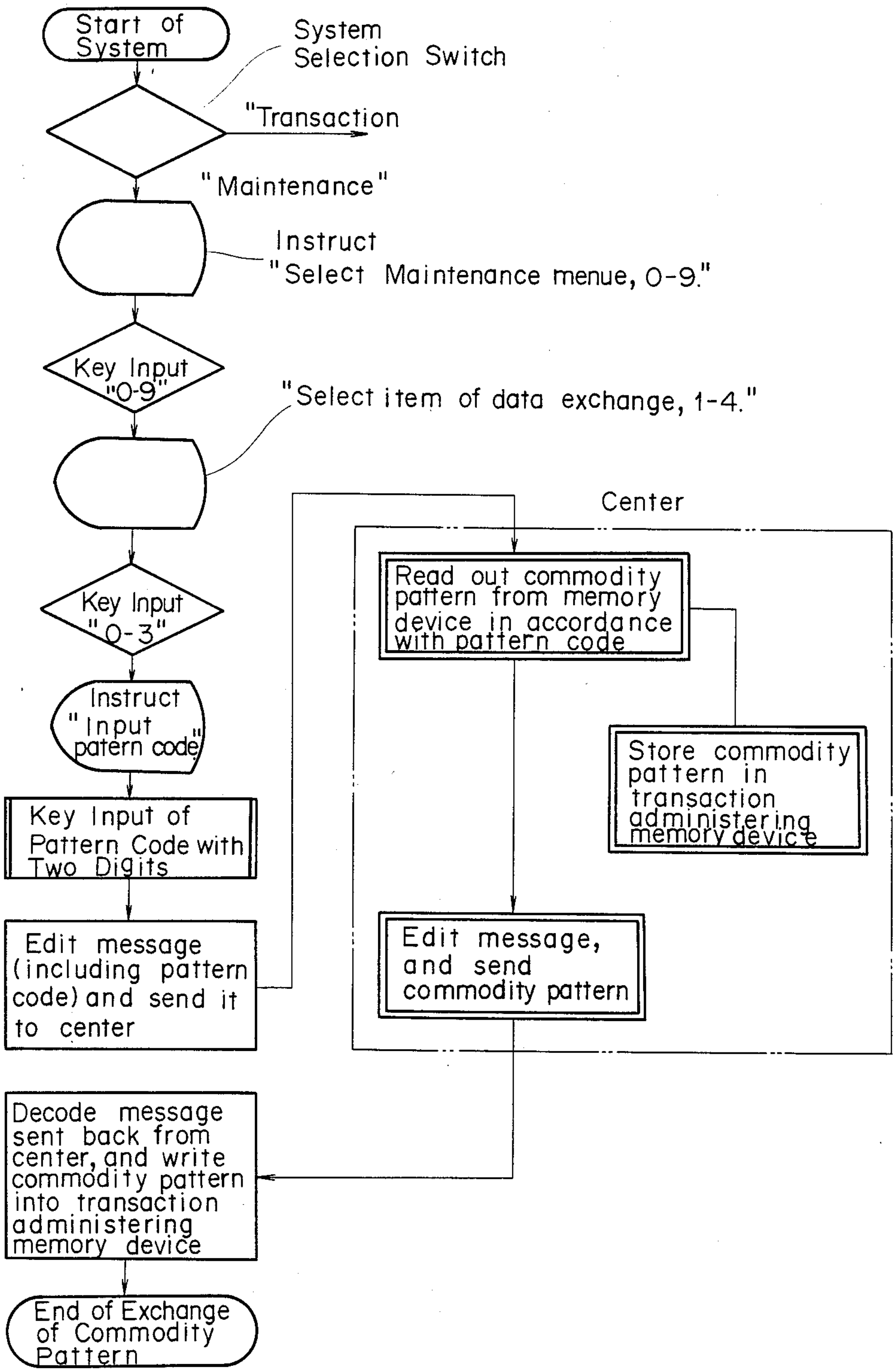
FIG. 4 is a flow chart showing the operation of the present invention.

FIG. 4 is a flow chart which shows the operation of the terminal transaction device according to the present invention. When a service man has placed a video tape on the shelf, he starts the terminal transaction device and selects "maintenance" with a system selection switch. Then, the display indicates "Select maintenance menu, 0–9" and thus instructs the service man to depress any of the ten-keys 0 thru 9.

Assuming that the key "7" be assigned to the exchange of data with the administration center, the depression of this key "7" presents an indication, "Item of Data Exchange, 0–4" on the display. When the key of "2" is depressed by way of example, the instruction of "Input of Pattern Code" alloted to this key is displayed.

When the service man inputs a pattern code of two digits with the ten-keys in response to the instruction, the terminal transaction device edits a message including this pattern code and sends it to the administration center.

In the center, a commodity pattern is read out of the memory device M in accordance with the pattern code, and it is transferred to the transaction administering memory device MT within the center and is stored therein so as to be used as data for administering transactions.

In a case where the terminal transaction device T requires commodity patterns in order to administer transactions, the center edits the commodity pattern read out of the memory device M, as a message and sends it to the terminal transaction device T, and the terminal having received the message decodes it and stores the commodity pattern in the transaction administering memory device MT' of its own.

It will be obvious from the above description that, in a case where both the center and the terminal require commodity data, the commodity pattern can be stored in the respective transaction administering memory devices MT and MT' thereof.

Further, although it has been assumed in the above description that the commodities and the shelves be in one-to-one correspondence, it will be obvious that the present invention is also applicable to a case where a predetermined number of commodities of identical sort are kept on the single shelf.

As thus far described, according to the present invention, in an on-line transaction network which deals in many sorts of commodities, transaction administration data can be obtained in an administration center and terminal transaction devices without inputting the data of the stocks of the respective sorts of commodities in the terminals on each occasion. This brings forth the effects that the labor of a service man who takes custody of the commodities is relieved and that errors attributed to the input operations can be prevented.

What is claimed is:

1. In an on-line transaction network having an administration center and a plurality of terminal transaction devices;

a commodity information transmission system comprising:

a memory device (M) which is disposed in said administration center (C) and in which a plurality of commodity patterns that specify corresponding relations between custodial positions of commodities in said terminal transaction devices (T) and contents of the commodities are stored along with pattern codes affixed to the commodity patterns, means to transmit the pattern code corresponding to the commodity pattern to said administration center (C) after the commodity has been placed in said terminal transaction device (T) in accordance with any of the commodity patterns, and a transaction administering memory device (MT) which is disposed in said administration center (C) and in which the commodity pattern read out of said memory device (M) in response to the transmitted pattern code is stored.

2. A commodity information transmission system as defined in claim 1, further comprising:

means to transfer the commodity pattern read out from said memory device (M), to said terminal transaction device (T) from which the pattern code has been transmitted, and a transaction administering memory device (MT') which is disposed in said each terminal transaction device (T) and in which the commodity pattern transferred from said administration center (C) is stored.

3. An on-line transaction network having:

an administration center;

a plurality of on-line terminal transaction devices in communication with said administration center, said administration center being remotely located from said terminal transaction devices;

a first memory means, located in said administration center, for storing a plurality of commodity patterns specifying corresponding relations between inventory positions of commodities in said terminal transaction devices and for storing contents of the commodities along with pattern codes affixed to the commodity patterns;

transmitting means operable upon placing of a commodity in said terminal transaction device in accordance with any of the stored commodity patterns, said transmitting means operable for transmitting to the administration center the pattern code corresponding to the commodity pattern, and second memory means in said administration center for storing a commodity pattern read out of said first memory means in response to the pattern code transmitted from the terminal transaction device and for use by a first processor means in said administration center for administering a transaction of said terminal transaction device.

4. An on-line transaction network as recited in claim 3, further comprising a second processor means in said terminal transaction device for administering a transaction of said terminal transaction device, wherein each of said plurality of terminal transaction devices includes third memory means for storing a commodity pattern read out of said first memory means in response to the pattern code transmitted from the terminal transaction device, said third memory means providing said commodity pattern therein to said second processor means for use in administering a transaction of said terminal transaction device.

5. An on-line transaction network as recited in claim 4, wherein said terminal transaction device keyboard switch means for inputting information to a processing means thereof, said keyboard switch means comprising:

first key means for selecting among a plurality of different transactions to be managed; and second key means for selecting an article to be dispensed.

6. An on-line transaction network as recited in claim 5, wherein said second key means comprises third key means for selecting between formats of a magnetic recording medium including the article and fourth key means for selecting between different articles conforming to the selected format.

7. An on-line transaction network as recited in claim 5 comprising further key means for use by service personnel for communicating inventory stocking information to the administration center.

8. An on-line transaction network as recited in claim 7, further comprising magnetic card reading means for obtaining credit information for billing to a user.

9. An on-line transaction network as recited in claim 3, further comprising magnetic card reading means for obtaining credit information for billing to a user.

10. An on-line transaction network as recited in claim 3, further comprising code reading means for reading commodity data from articles being dispensed by said terminal transaction device.

11. An on-line transaction network as recited in claim 3, further comprising modem means for communicating data between said administration center and said on-line terminal transaction devices.

12. An on-line transaction network as recited in claim 11, wherein said modem means comprises first modem means located at said administration center and plural second modem means respectively located at each of said terminal transaction devices.

* * * * *

UNITED STATES PATENT AND TRADEMARK OFFICE
CERTIFICATE OF CORRECTION

PATENT NO. : 4,800,254

DATED : January 24, 1989

INVENTOR(S) : Shigeaki SUZUKI and Tatsuya NOZAKI

It is certified that error appears in the above-identified patent and that said Letters Patent is hereby corrected as shown below: Title page, item [73] should read as follows:

-- [73] Assignees: CKD Corporation; Credix Corporation,
both of Japan --

Signed and Sealed this

Twenty-sixth Day of December, 1989

*Attest:*

JEFFREY M. SAMUELS

*Attesting Officer* *Acting Commissioner of Patents and Trademarks*